(12) United States Patent
Meyers et al.

(10) Patent No.: US 9,201,465 B2
(45) Date of Patent: Dec. 1, 2015

(54) INFORMATION HANDLING SYSTEM HOUSING LID WITH SYNCHRONIZED MOTION

(71) Applicant: Dell Products L.P., Round Rock, TX (US)

(72) Inventors: David M. Meyers, Round Rock, TX (US); Justin C. Lyles, San Diego, CA (US)

(73) Assignee: Dell Products L.P., Round Rock, TX (US)

( * ) Notice: Subject to any disclaimer, the term of this patent is extended or adjusted under 35 U.S.C. 154(b) by 266 days.

(21) Appl. No.: 13/839,873

(22) Filed: Mar. 15, 2013

(65) Prior Publication Data
US 2014/0268533 A1 Sep. 18, 2014

(51) Int. Cl.
*G06F 1/16* (2006.01)

(52) U.S. Cl.
CPC .............. *G06F 1/1681* (2013.01); *Y10T 16/547* (2015.01); *Y10T 29/24* (2015.01)

(58) Field of Classification Search
CPC ........................................................ G06F 1/16
USPC ............ 361/679.01–679.45, 679.55–679.61, 361/724–727, 728–747, 752–759, 361/796–837; 312/223.2, 7.1, 319.9, 333, 312/348.3, 222, 226; 455/575.1–575.5, 455/347, 550.1, 90.3; 248/309.1, 316.8, 248/917, 922, 923, 346.4
See application file for complete search history.

(56) References Cited

U.S. PATENT DOCUMENTS

| | | | |
|---|---|---|---|
| 3,402,422 A * | 9/1968 | Baer | 16/366 |
| 5,325,984 A * | 7/1994 | Ady et al. | 220/817 |
| 6,266,236 B1 | 7/2001 | Ku et al. | |
| 6,771,494 B2 | 8/2004 | Shimano | |
| 6,901,937 B2 | 6/2005 | Sebban | |
| 7,002,791 B2 | 2/2006 | Diatzikis et al. | |
| 7,155,266 B2 | 12/2006 | Stefansen | |
| 7,239,508 B2 | 7/2007 | Ferrucei | |
| 7,484,271 B2 * | 2/2009 | Oshima et al. | 16/366 |
| 7,513,011 B2 * | 4/2009 | Lu et al. | 16/337 |
| 7,619,879 B2 | 11/2009 | Aoyama et al. | |
| 7,730,587 B2 | 6/2010 | Chang et al. | |
| 7,738,930 B2 * | 6/2010 | Petrella | 455/575.3 |
| 8,141,205 B2 * | 3/2012 | Zhang et al. | 16/303 |
| 8,289,688 B2 | 10/2012 | Behar et al. | |
| 8,615,848 B2 * | 12/2013 | Mitsui | 16/366 |
| 2005/0050686 A1 * | 3/2005 | Kurokawa | 16/354 |
| 2006/0236505 A1 * | 10/2006 | Maatta et al. | 16/366 |
| 2008/0109995 A1 * | 5/2008 | Kuwajima et al. | 16/354 |
| 2008/0242359 A1 * | 10/2008 | Seol et al. | 455/566 |
| 2008/0307608 A1 * | 12/2008 | Goto | 16/366 |
| 2009/0070961 A1 * | 3/2009 | Chung et al. | 16/354 |
| 2009/0282650 A1 * | 11/2009 | Jin et al. | 16/367 |
| 2010/0071159 A1 * | 3/2010 | Myung | 16/303 |
| 2011/0271486 A1 * | 11/2011 | Wang et al. | 16/319 |
| 2012/0096678 A1 * | 4/2012 | Zhang et al. | 16/302 |
| 2012/0182677 A1 * | 7/2012 | Seo | 361/679.01 |
| 2012/0248048 A1 * | 10/2012 | Wu et al. | 211/26 |
| 2014/0268533 A1 * | 9/2014 | Meyers et al. | 361/679.27 |

* cited by examiner

*Primary Examiner* — Courtney Smith
*Assistant Examiner* — Rashen E Morrison
(74) *Attorney, Agent, or Firm* — Terrile, Cannatti, Chambers & Holland, LLP; Robert W. Holland

(57) ABSTRACT

An information handling system converts from a closed position to a tablet position by rotating a lid with a display 360 degrees about a hinge having synchronized and continuous motion. The hinge has first and second axles held distal by a spacer. A synchronizer translates motion of each axle to the other to provide fluid movement of the lid relative to the housing. For instance, first and second cables translate rotational motion with the disposition of a discontinuous figure eight between the first and second axles.

18 Claims, 9 Drawing Sheets

INFORMATION HANDLING SYSTEM HOUSING LID WITH SYNCHRONIZED MOTION

BACKGROUND OF THE INVENTION

1. Field of the Invention

The present invention relates in general to the field of information handling system housings, and more particularly to an information handling system housing lid with synchronized motion.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems are built in housings having a variety of configurations. A traditional clamshell configuration has a lid rotationally coupled to a main chassis portion so that the lid articulates between open and closed positions. In the open position, the lid rotates approximately 90 degrees to expose a display that presents visual information provided by processing components disposed in the main chassis portion. In the closed position, the lid rotates to bring the display against the main chassis portion to provide portability. Although conventional clamshell configurations provide ease of use and convenience, when the lid is free to rotate the display supported by the lid generally does not offer a firm enough platform for accepting touchscreen inputs. For this and other reasons, portable information handling systems that include a touchscreen display in an articulating lid generally provide rotation to a tablet-type of configuration in which the lid is supported to remain stationary during touch interfaces. For example, one option is to rotate the lid from the closed position for 360 degrees so that the display is exposed like a tablet and resting against the bottom surface of the main chassis portion.

One difficulty with rotation of an information handling system lid for 360 degrees relative to a housing is that the hinge used to perform the rotation has to allow the lid to rest flat relative to both the upper and lower surfaces of the housing. Although a relatively large hinge can include movement of the lid relative to the housing so that flat alignment to an upper and lower surface is provided, end user's generally prefer to have portable information handling systems with a small form factor. One alternative that provides full rotation is the use of a double hinge so that motion is provided at an axis proximate to the lid and an axis proximate the housing. The lid opens to expose the display by rotating about the axis proximate the lid and rotates to an opposite surface of the housing about the axis proximate the housing. In order to coordinate the movement of the lid relative to the housing, one or more cams engage as the lid rotates so that movement occurs about one axis or the other in an unsynchronized and discontinuous fashion, such as two 180 degree movements of the lid relative to the housing.

SUMMARY OF THE INVENTION

Therefore a need has arisen for a system and method which provides synchronized and continuous movement of a lid relative to a housing for conversion of a portable information handling system to and from a tablet configuration.

In accordance with the present invention, a system and method are provided which substantially reduce the disadvantages and problems associated with previous methods and systems for rotation an information handling system lid relative to a housing. Continuous motion of an information handling system housing and lid is provided by a hinge having first and second axles synchronized by translation of motion between the first to the second axles.

More specifically, an information handling system processes information with components disposed in a housing, such as a processor and memory, and present the information as visual images at a display disposed in a lid. The lid rotates substantially 360 degrees relative to the housing between a closed position and a tablet position. A hinge couples the lid to the housing with a first axle coupled to the lid and a second axle coupled to the housing. A spacer holds the first and second axles apart from each other and provides friction against rotation of the first and second axles. A synchronizer translates rotation of first and second axles to each other to provide synchronized and continuous motion of the lid relative to the housing. For example, the synchronizer is a first and second cable formed as a discontinuous figure eight with on cable translating rotation in one direction and the other cable translating rotation in the opposite direction.

The present invention provides a number of important technical advantages. One example of an important technical advantage is that synchronized and continuous movement is provided for a lid relative to a housing during conversion of a portable information handling system to and from a tablet configuration. End users are provided with an improved user experience with full movement of a lid relative to a display that is not broken up as different portions of a hinge provide movement. Motion about each axis of a double hinge is maintained fluidly relative to each other by a cable that synchronizes motion of the axles as one axle moves relative to the other. Rotating axles fluidly coupled by a cable provide improved reliability relative to a cam-regulated motion since friction wear at a cam does not affect motion of lid relative to the housing over time and use.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system rotates a lid relative to a housing with a continuous and synchronized motion of a two-axle hinge having the axles coupled to each other by a synchronizer. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
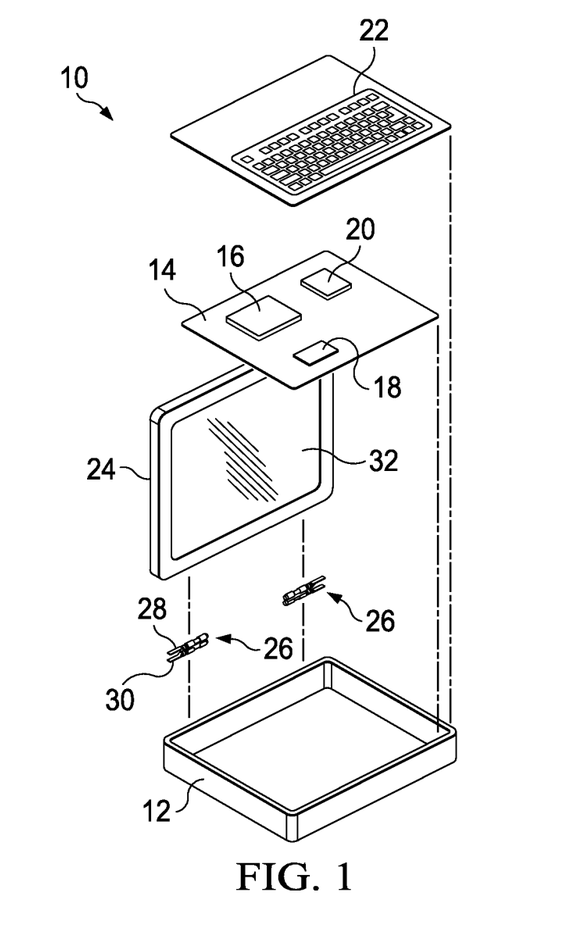
FIG. 1 depicts a blow-up view of a portable information handling system that processes information in a tablet configuration.

Referring now to FIG. 1, a blow-up view depicts a portable information handling system 10 that processes information in a tablet configuration. Portable information handling system 10 has a housing 12 that supports components to perform processing of information, such as a motherboard 14 that interfaces a CPU 16, RAM 18 and a chipset 20. Once motherboard 14 is assembled in housing 12, a keyboard 22 is placed over the components and interfaced with the chipset to accept end user inputs. A lid 24 rotationally couples with housing 12 by first and second hinges 26. Each hinge 26 includes a lid coupler 28 that couples hinge 26 to lid 24 and a housing coupler 30 that couples hinge 26 to housing 12. A display 32 disposed in lid 24 interfaces with components disposed in housing 12 to present information as visual images. Display 32 rotates with lid 24 and includes a touchscreen that accepts touch inputs so that an end user can change the position of display 32 as desired to view information and make touch inputs. In alternative embodiments, alternative types of configurations may be used for housing 12, lid 24 and hinges 26. For instance, instead of using two separate hinges 26, one continuous hinge may be used. Hinges 26 may be disposed in alternative locations as desired to rotate housing 12 and lid 24 relative to each other. The example information handling system configuration depicted by FIG. 1 is not meant to limit the synchronized and continuous motion of hinge 26 in alternative types of housings and devices.

Figure 2A:
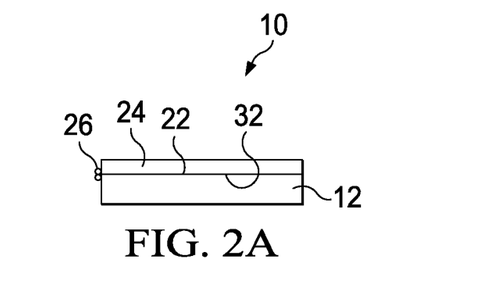
FIGS. 2A, 2B and 2C depict the portable information handling system in closed, clamshell and tablet configurations respectively.
Figure 2B:
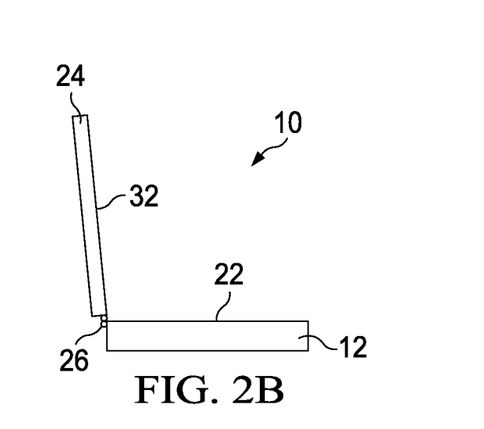
Figure 2C:
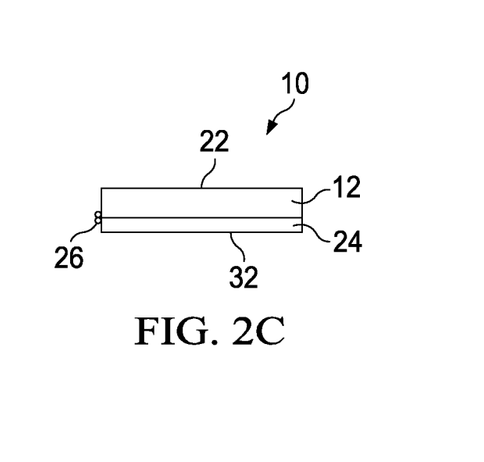

Referring now to FIGS. 2A, 2B, and 2C, the portable information handling system 10 is depicted in closed, clamshell and tablet configurations respectively. FIG. 2A depicts lid 24 rotated to a closed position so that display 32 is protected and resting against keyboard 22. FIG. 2B depicts lid 24 rotated substantially 90 degrees about hinge 26 relative to housing 12 to an open clamshell configuration having display 32 presented to an end user for viewing and keyboard 22 presented to an end user for accepting inputs. FIG. 2C depicts lid 24 rotated substantially 360 degrees about hinge 26 relative to housing 12 to a tablet configuration. In FIG. 2C, lid 24 rotates to a position underneath housing 12 to expose display 32 at the bottom of housing 12 and keyboard 22 at the top of housing 12. To use information handling system 10 as a tablet, the end use flips housing 12 to expose display 32 on top and makes inputs to the touchscreen.

Figure 3:
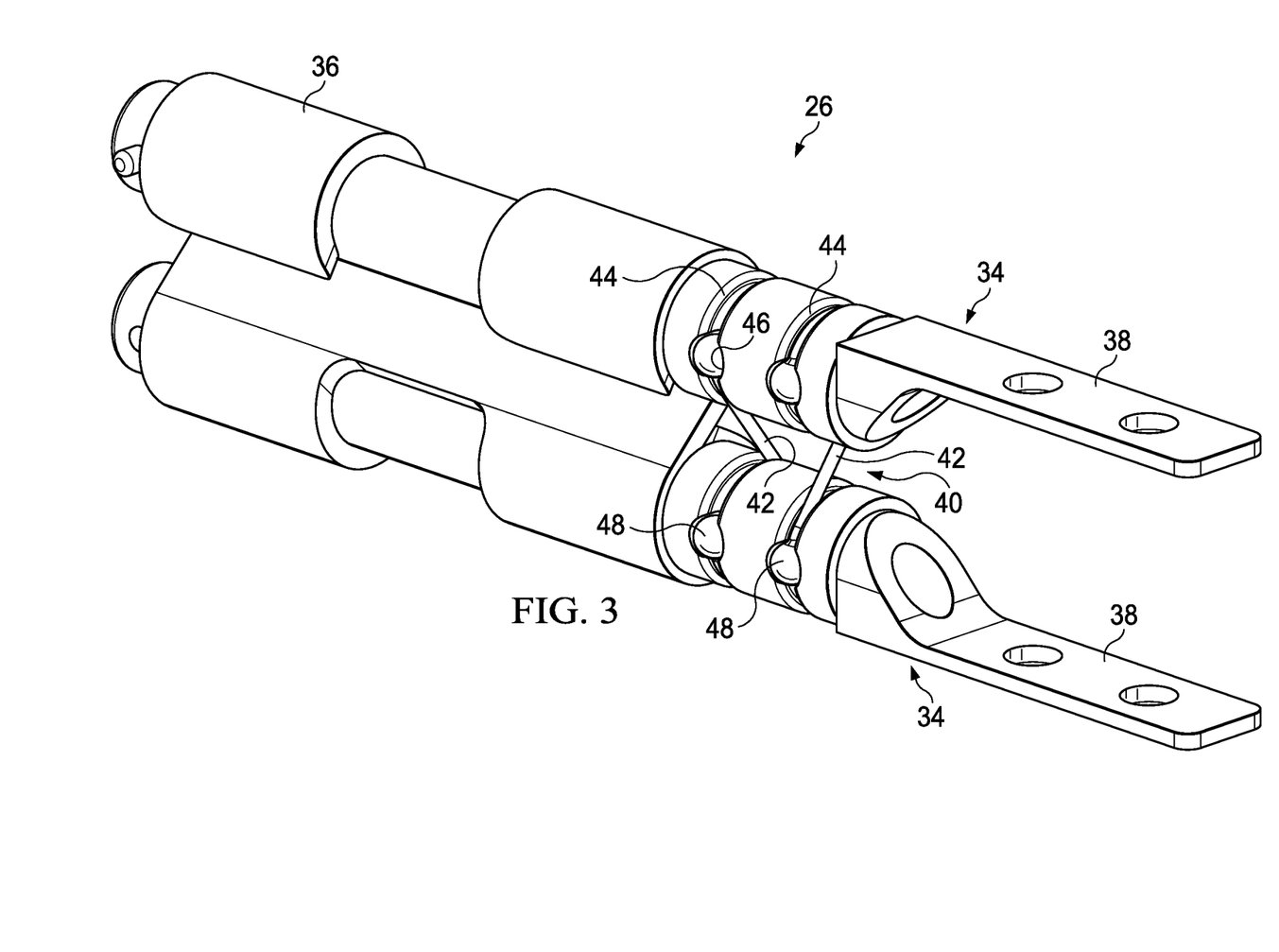
FIG. 3 depicts a side perspective view of a hinge for rotationally coupling the portable information handling system lid and housing.

Referring now to FIG. 3, a hinge 26 for rotationally coupling the portable information handling system lid 24 and housing 12 is depicted. Hinge 26 has first and second axles 34 held in a substantially parallel configuration by a spacer 36. Each axle 34 terminates at a coupler 38 that couples to a housing or lid coupler. Axles 34 rotated within spacer 36 and have some friction applied to rotational movement by spacer 36 so that movement of lid 24 is not too free relative to housing 12. Rotation of axles 34 is synchronized relative to each other by a synchronizer 40 that couples to each of the axles 34. In the example embodiment, synchronizer 40 is a pair of separate cables 42 coupled around axles 34 to form a discontinuous figure eight. Rotation of one axle 34 translates to the other as cables 42 rotate in guides 44 relative to attachment points 46 where a ball 48 rests in a guide 44 opening.

Figure 4:
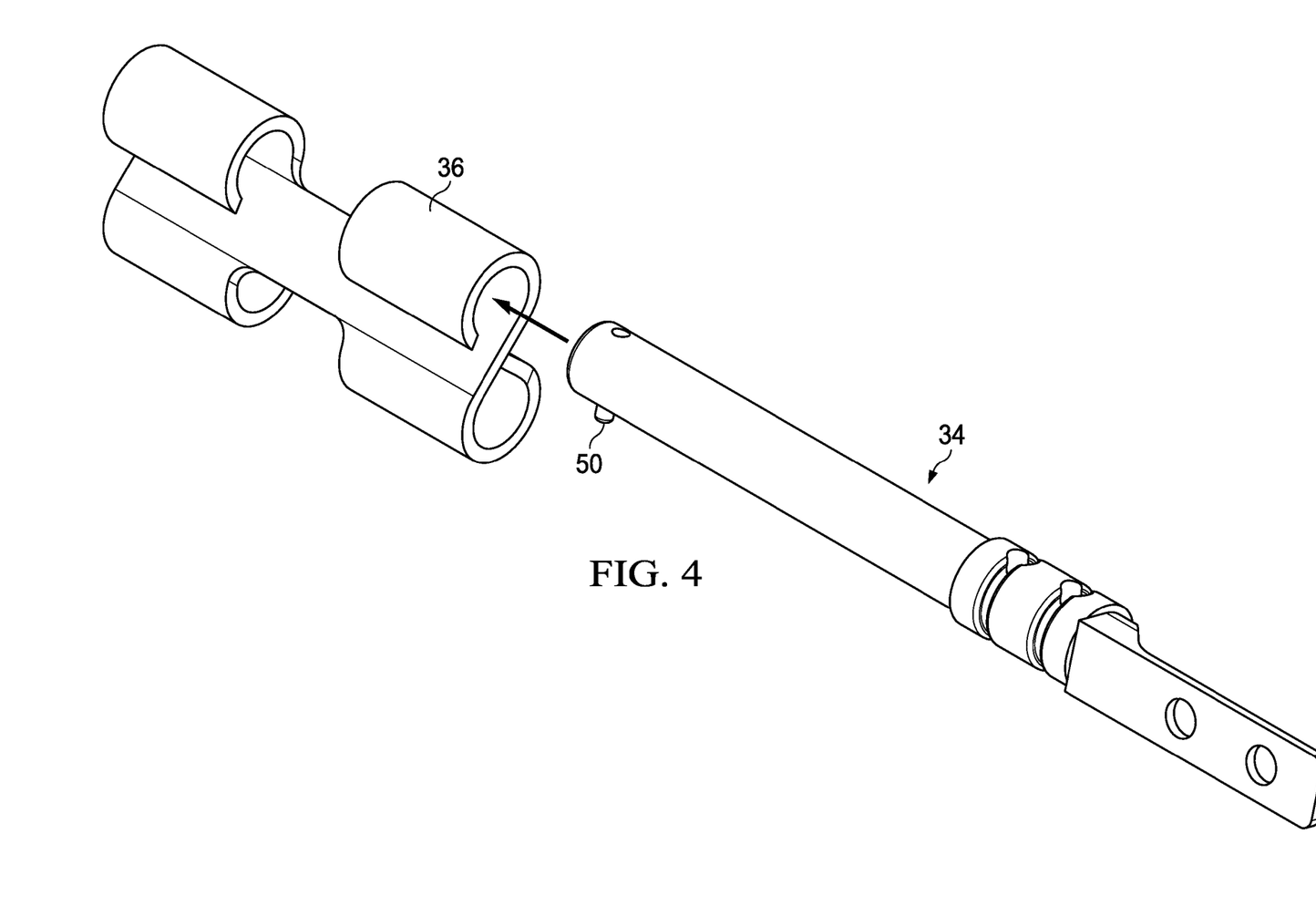
FIG. 4 depicts assembly of a hinge with insertion of an axle into a spacer.
Figure 5:
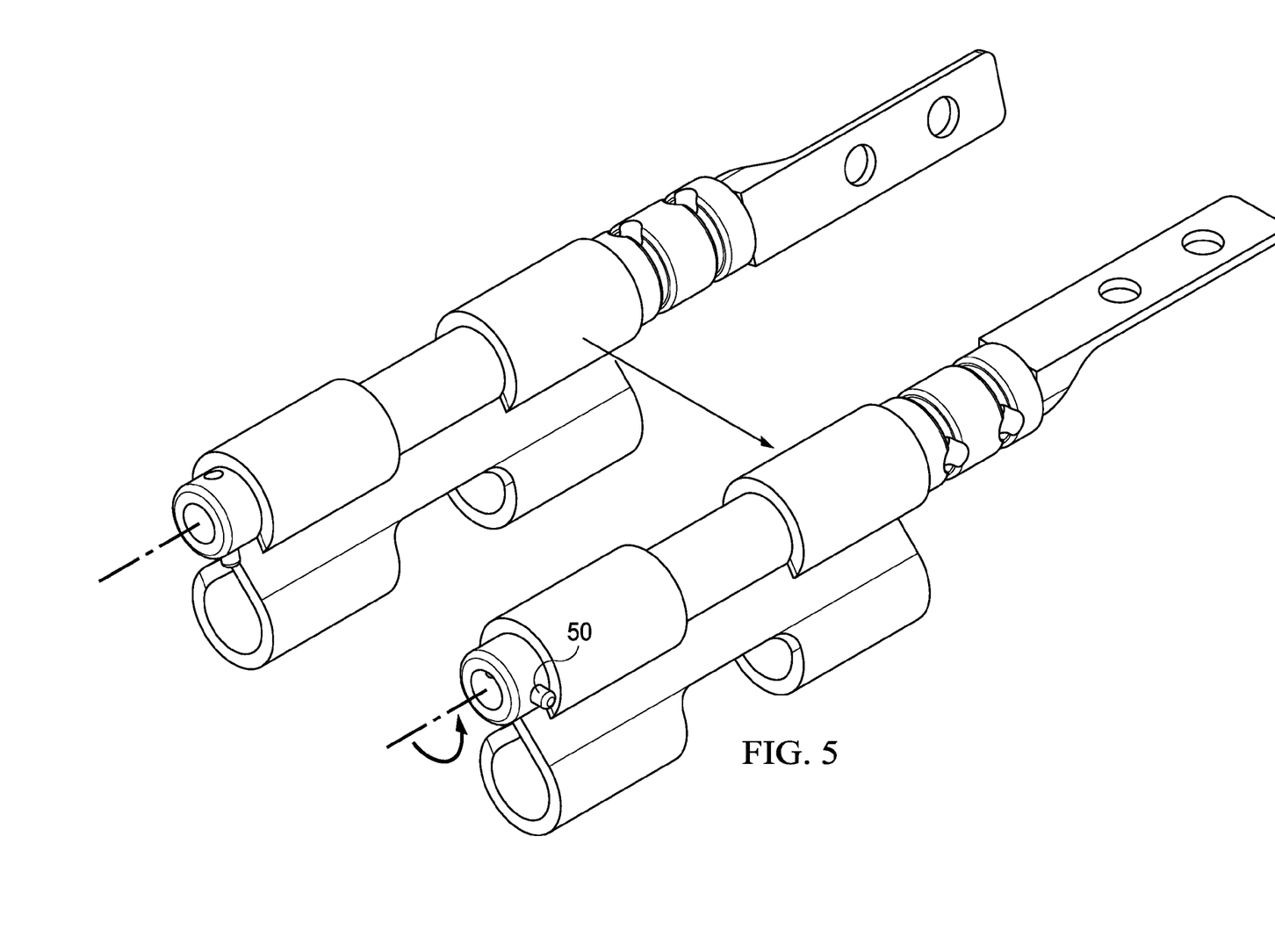
FIG. 5 depicts rotation of the axle in the spacer to lock the axle in place.
Figure 6:
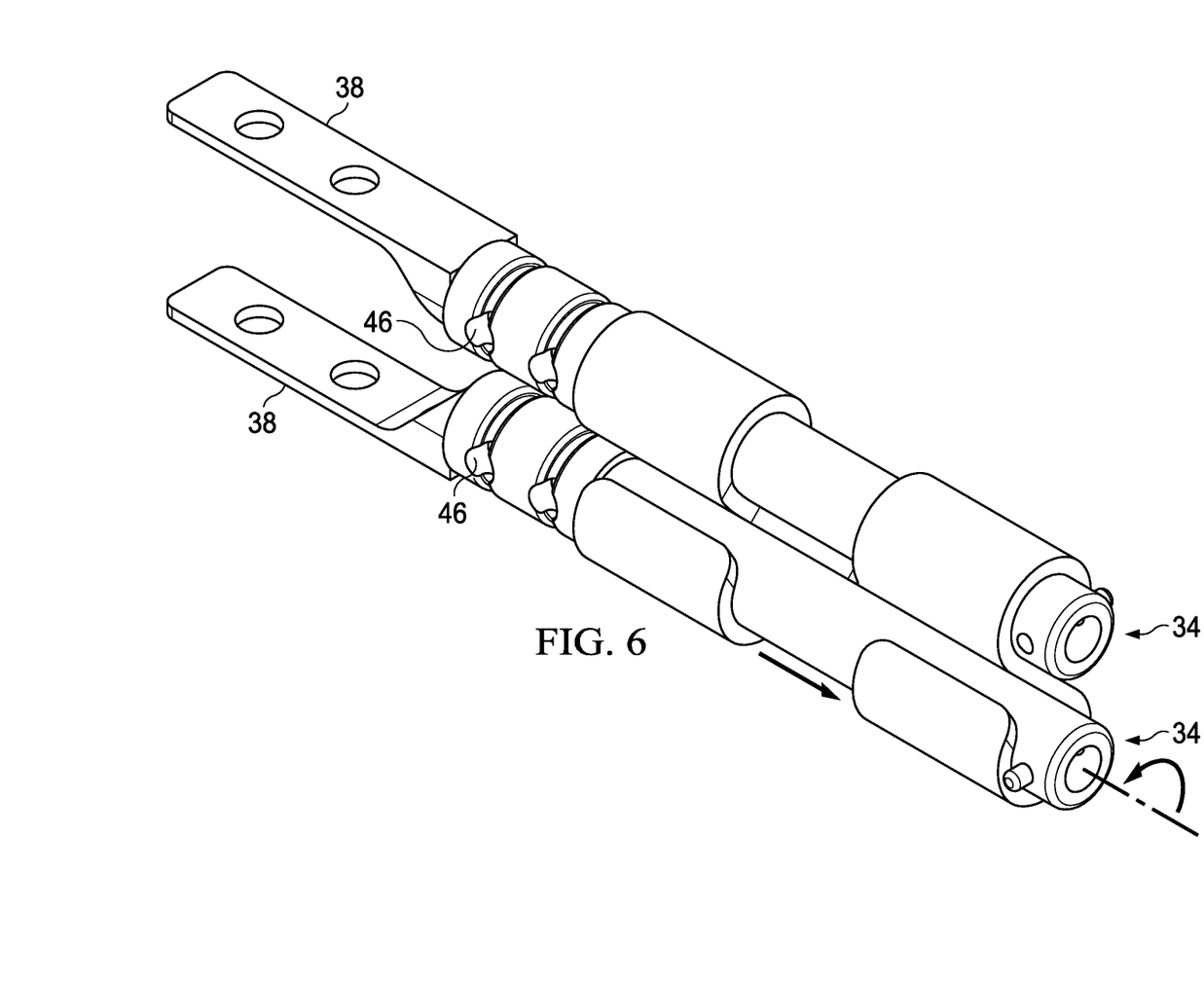
FIG. 6 depicts assembly of a second axle in the spacer so that the first and second axles are held distal each other.

Referring now to FIG. 4, assembly is depicted of a hinge 26 with insertion of an axle 34 into a spacer 36. Spacer 36 has an opening that allows a dowel 50 coupled to axle 34 to slide through so that axle 34 inserts completely through spacer 36. Referring now to FIG. 5, rotation of the axle 34 in the spacer 36 is depicted to lock the axle 34 in place. Dowel 50 rotates so that spacer 36 prevents removal of axle 34. The example embodiment provides one example of an assembly of an axle 34 into a spacer 36, however, in alternative embodiments, alternative types of securing techniques may be used. Referring now to FIG. 6, assembly of a second axle 34 in the spacer 36 is depicted so that the first and second axles 36 are held distal each other in a substantially parallel alignment. The second axle 34 has a dowel inserted through the opening of spacer 36 that is engaged by a rotation so that the second axle 34 will not slide out of spacer 36. When axles 34 are fully inserted and rotated, attachment points 46 align in position to accept cables 42 so that couplers 38 align to couple with housing 12 and lid 24.

Figure 7:
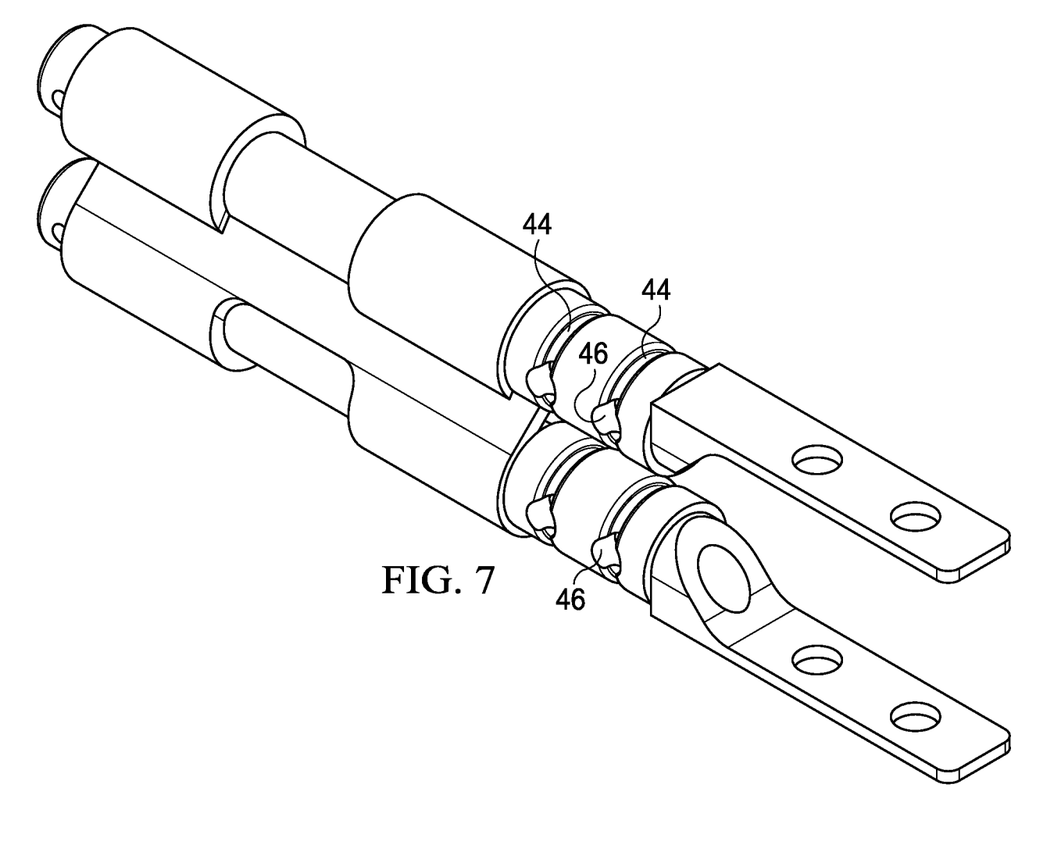
FIG. 7 depicts a side perspective view of a partially-assembled hinge prepared for assembly of a synchronizer.
Figure 8:
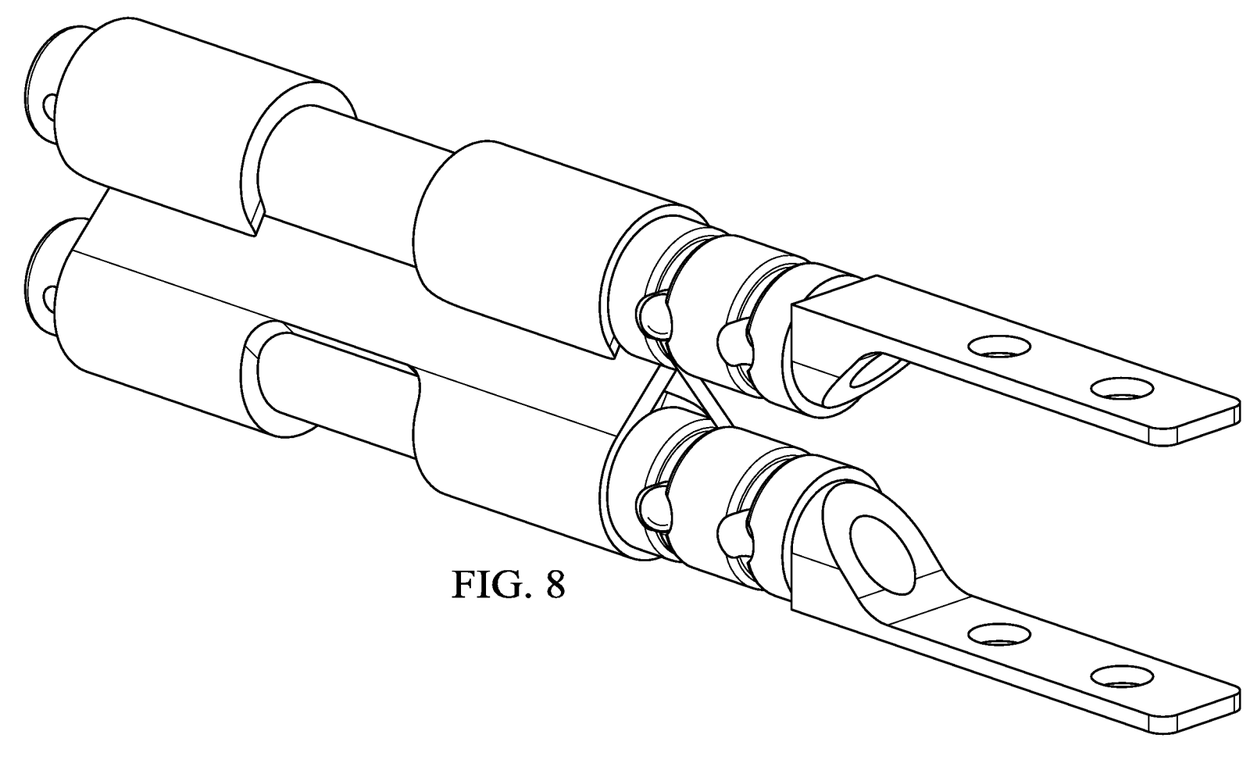
FIG. 8 depicts assembly of a first flexible member of a synchronizer to couple first and second axles together.

Referring now to FIG. 7, a side perspective view depicts a partially-assembled hinge 26 prepared for assembly of a synchronizer 40. Attachment points 46 and guides 44 are aligned in position to accept first and second cables 42. Each cable 42 has a shape of one-half of a figure eight with a loop 52 that wraps around an axle 34 and a ball 54 at each end that couples to an attachment point 46 of axle 34. When an axle 34 rotates about loop 52 to pull on the ball 54 of loop 52, the force of the rotation translates to pull on the attachment point 46 of the other axle 34 so that both axles rotate in a synchronized and continuous fashion. The loop 52 of one cable 42 wraps around one axle 34 and the loop 52 of another cable 42 wraps around the other axle 34 so that rotation in either direction by either axle 34 is translated to the other axle 34. FIG. 8 depicts hinge 26 with one cable 42 having balls 54 at each end coupled to each of axle 34 to form one half of a FIG. 8. FIG. 3 depicts both cables 42 couple to both axles 34 so that each cable wraps around one of the axles. When both cables 42 couple to both axles, the cables 42 form a discontinuous FIG. 8 with each cable providing one-half of the figure eight. The first cable 42 is assembled by inserting balls 54 into attachment points 46 and rotating to wrap the cable 42 around one of the axles 34. The second cable 42 is assembled in the opposite direction so that it wraps about the other axle 34 and so that all balls 54 are aligned on the same side of hinge 26. In alternative embodiments, alternative arrangements of cables 42 may be used as desired to provide synchronization of axles 34 during rotation in both directions. The type of relative motion for the axles 34 may be affected by changing the shape of axle 34 where the cables rotate, such as placing a cam one side of axle 34 where the cable rests.

Figure 9:
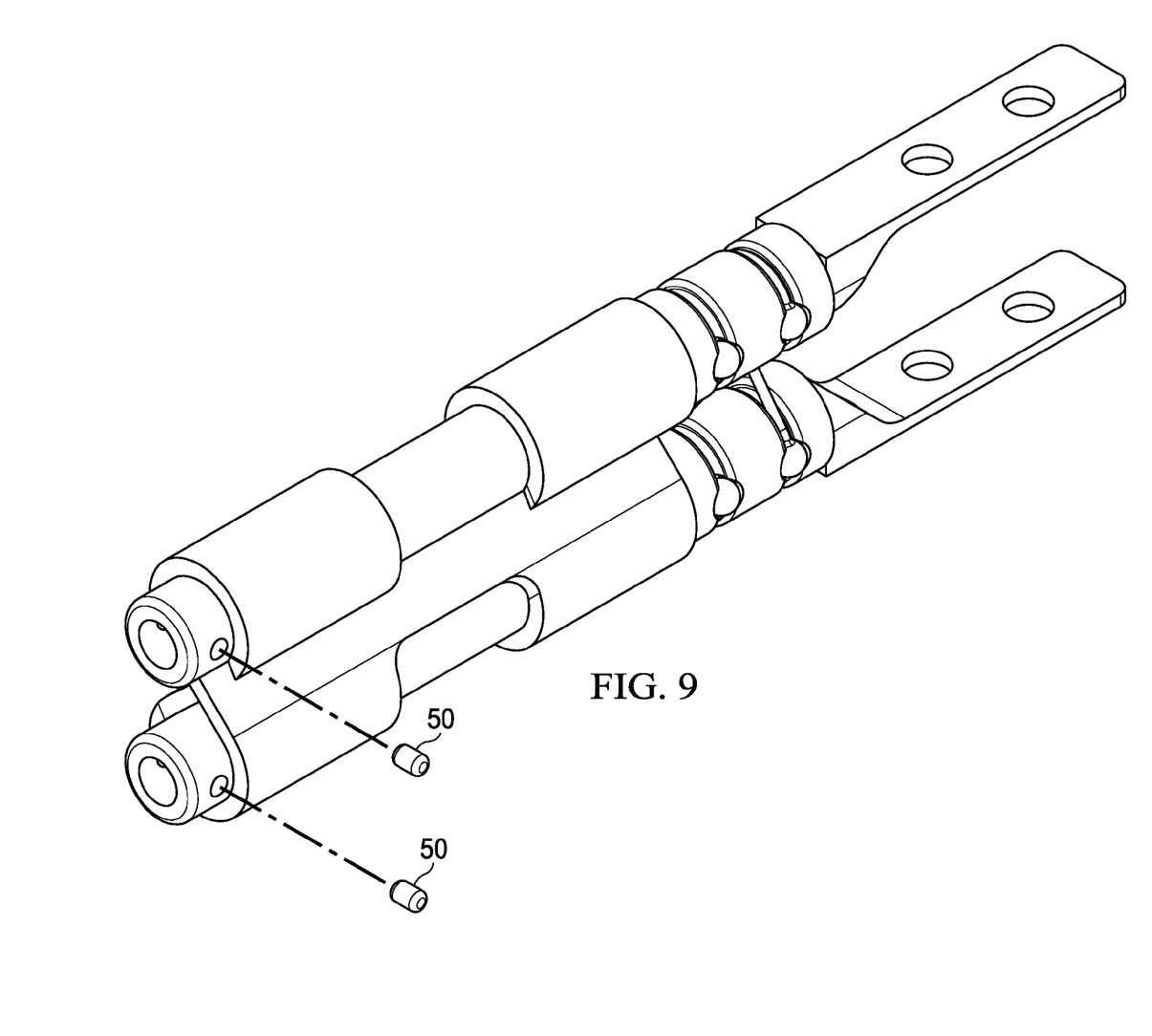
FIG. 9 depicts removeable dowel pins that retain a spacer in position with first and second assembled axles.
Figure 10:
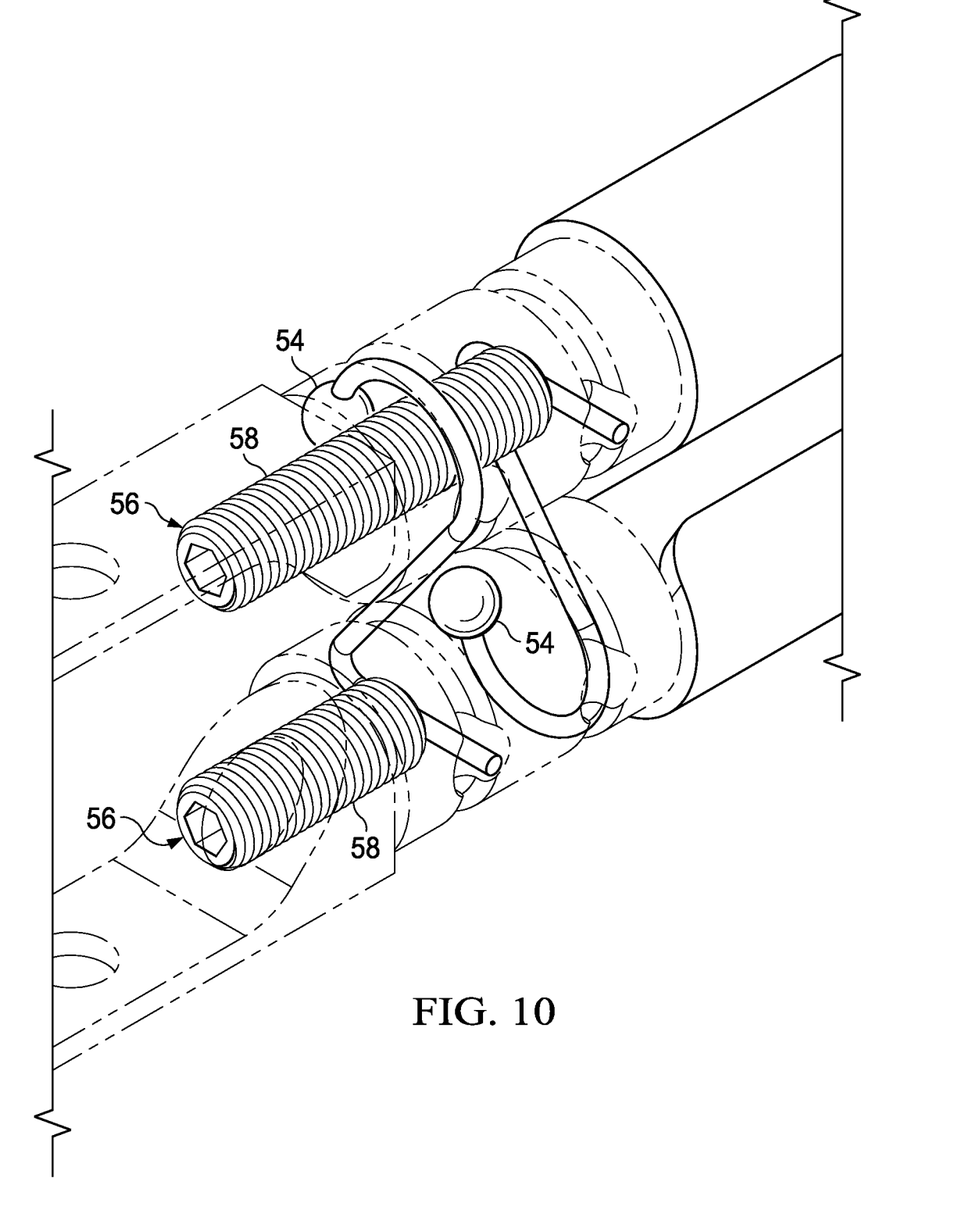
FIG. 10 depicts one example technique for adjusting flexible synchronizer members to couple in a desired position the first and second axles.

Referring now to FIG. 9, removeable dowel pins 50 are depicted that retain a spacer 36 in position with first and second assembled axles 34. By having dowels 50 remove and re-insert, axles 34 assemble more easily from both sides of spacer 36. Axles 34 may have cables 42 assembled and then couple to spacer 34 for more easy manipulation. Referring now to FIG. 10, another example technique is depicted for adjusting flexible synchronizer members 42 to couple in a desired position at the first and second axles 34. The length of cables 42 is set by inserting a ball 54 at one end in an attachment point 46 and inserting the other end of cable 42 into an opening of axle 34. Once cable 42 is in place and at the correct tightness, a set screw 56 tightens into threads 58 formed in axle 34 so that the end of cable 42 is held in place. Cable 42 may then be clipped at the proper length. In alternative embodiments, alternative techniques may be used to hold cable 42 at a desired length for translation of rotational movement at an axle 34 to the other axle 34.

Although the present invention has been described in detail, it should be understood that various changes, substitutions and alterations can be made hereto without departing from the spirit and scope of the invention as defined by the appended claims.

What is claimed is:
1. An information handling system comprising:
a housing;
components disposed in the housing and operable to cooperate to process information;
a lid;
a display disposed in the lid, the display interfaced with the components to present the information as visual images;
a hinge rotationally coupling the housing and lid, the hinge having a first axle coupled at an end to the housing, a second axle coupled at an end to the lid, each of the first and second axles having an end, a spacer holding the first and second axles distal each other and a synchronizer translating rotation of each axle to the other axle, the synchronizer having a first flexible member translating rotation in a first rotating direction and a second flexible member translating rotation in a second rotating direction opposite the first rotating direction, each flexible member having a ball at a first end, each ball sized to engage an attachment point of each axle; and
a lock inserting into each axle end along an axis parallel to each axle to engage each flexible member distal the flexible member first end, the lock maintaining each flexible member in position relative to each axle.

2. The information handling system of claim 1 wherein the flexible member comprises a cable coupled to the first and second axles, the cable wrapping around the first axle to pull on the second axle when the first axle rotates.

3. The information handling system of claim 1 wherein the synchronizer flexible members comprises:
a first cable having a first end coupled to the first axle, the first cable wrapped around the first axle, and a second end coupled to the second axle, the cable pulling on the second axle when the first axle rotates in a first direction; and
a second cable having a second end coupled to the second axle, the second cable wrapped around the second axle, and a second end coupled to the first axle, the cable pulling on the first axle when the second axle rotates in a second direction.

4. The information handling system of claim 3 wherein the first and second cables form a disconnected figure eight.

5. The information handling system of claim 3 wherein at least one end of the first cable couples by a tightening device operable to set the first cable length.

6. The information handling system of claim 1 wherein the spacer provides friction against rotation of the first and second axles.

7. The information handling system of claim 1 wherein the lid rotationally couples to the housing with first and second hinges.

8. A method for rotating an information handling system lid relative to a housing, the method comprising: coupling a first axle to the lid; coupling a second axle to housing; moving the lid to rotate the first axle; and transferring rotation of the first axle to the second axle with a first flexible member translating rotation in a first rotating direction and a second flexible member translating rotation in a second rotating direction opposite the first rotating direction, each flexible member having a ball at a first end, each ball sized to engage an attachment point of each axle and a lock inserting into each axle end along an axis parallel to each axle to engage each flexible member distal the flexible member first end, the lock maintaining each flexible member in position relative to each axle.

9. The method of claim 8 wherein the transferring rotation further comprises:
transferring rotation in a first direction with a first flexible member; and
transferring rotation in a second direction with a second flexible member.

10. The method of claim 9 wherein the first and second flexible members comprise cables.

11. The method of claim 10 wherein the first and second cables form a disconnected figure eight.

12. The method of claim 8 further comprising:
holding the first and second axle relative to each other with a spacer coupled to each of the first and second axle; and
providing friction to rotation of the first and second axle with the spacer.

13. The method of claim 8 wherein moving the lid comprises rotating the lid from a closed position relative to the housing for substantially 360 degrees to a tablet position relative to the housing.

14. A hinge for rotating an information handling system lid between a closed position and a tablet position relative to a housing, the hinge comprising: a first axle coupled to the lid; a second axle coupled to the housing; and a flexible member coupled to the first and second axle to translate rotation of the first axle into rotation of the second axle the flexible member having a first end with an enlarged portion to engage an attachment point of the first axle and a second end sized to fit into an opening of the second axle; and a lock inserting into each axle end along an axis parallel to each axle to engage each flexible member distal the flexible member first end, the lock maintaining each flexible member in position relative to each axle.

15. The hinge of claim 14 further comprising a spacer holding the first and second axle in a distal spaced relationship.

16. The hinge of claim 15 wherein the space comprises a friction source biased against rotation of the first and second axles.

17. The hinge of claim 14 wherein the flexible member comprises first and second cables, a first cable translating motion of the first axle to the second axle, the second cable translating motion of the second axle to the first axle.

18. The hinge of claim 17 wherein the first and second cables form a disconnected figure eight.

* * * * *